Patented Nov. 28, 1922.

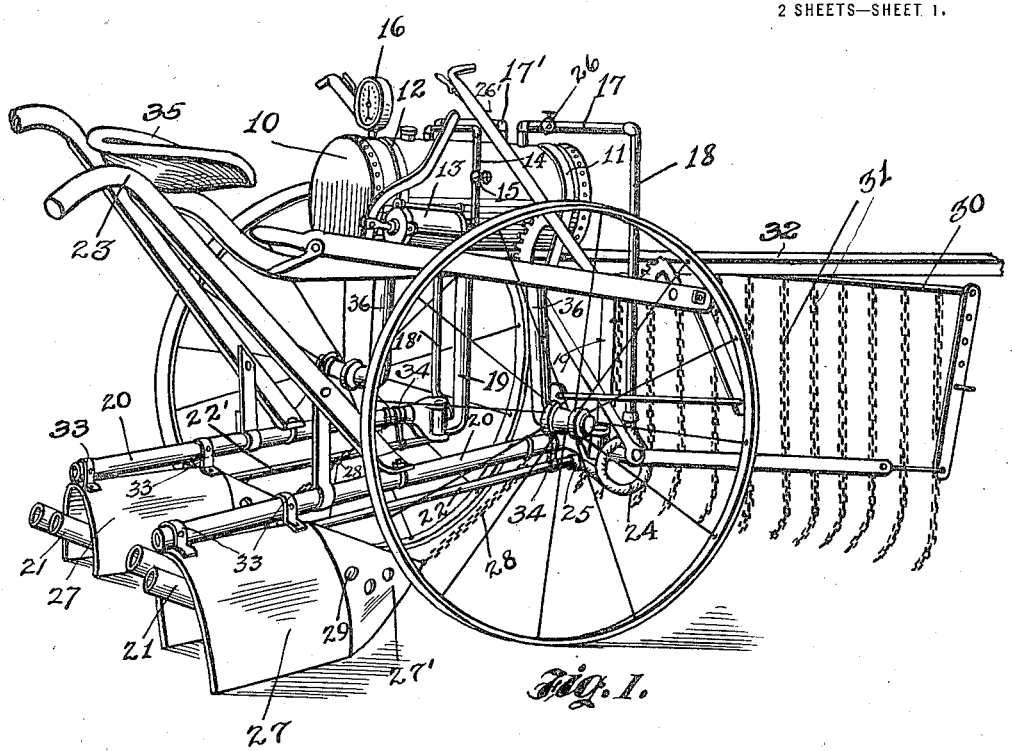
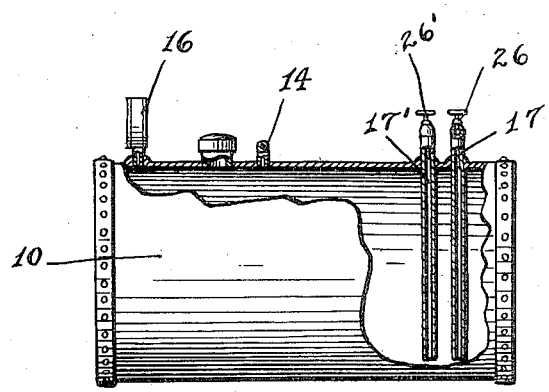

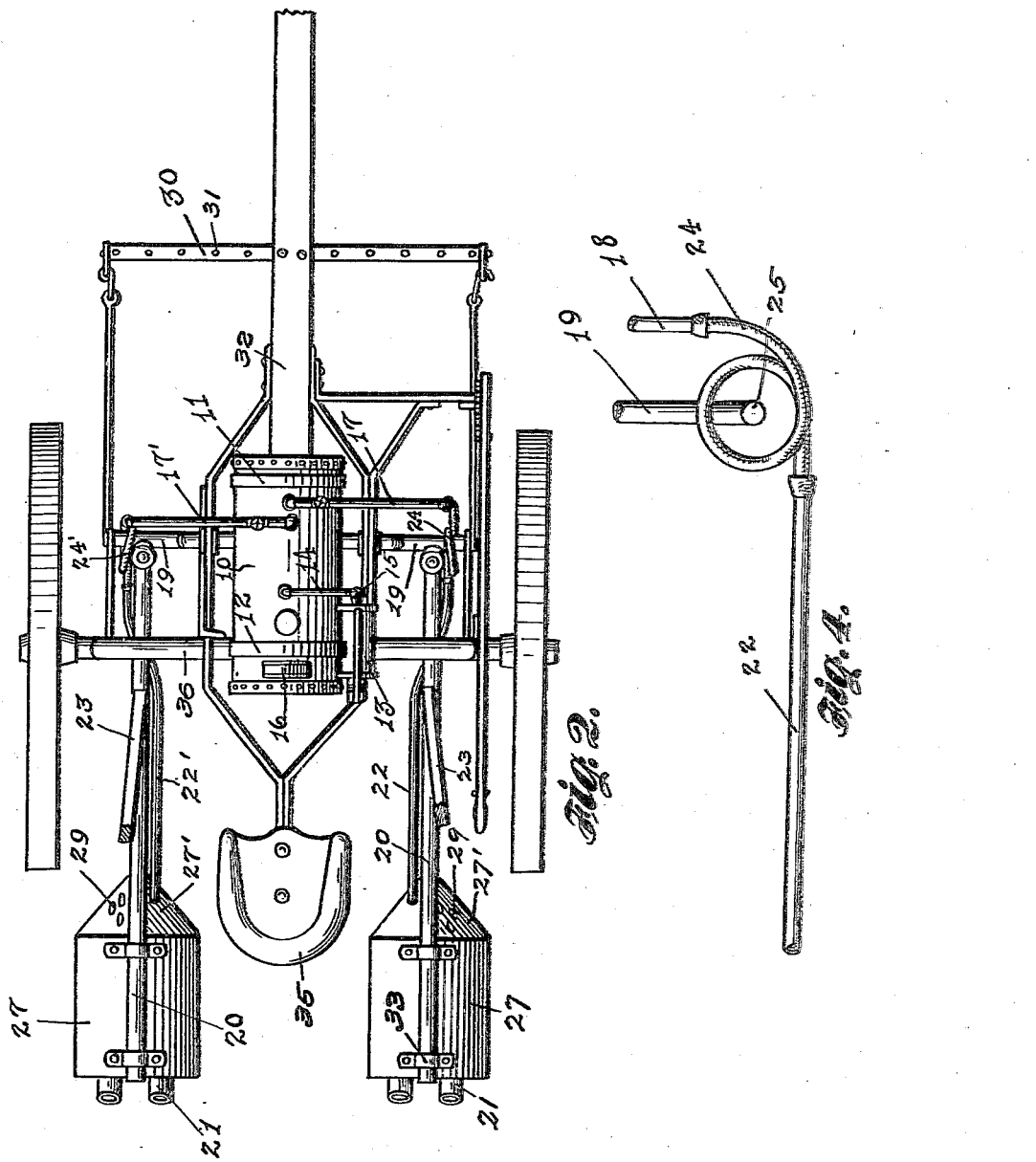

1,436,958

UNITED STATES PATENT OFFICE.

PAUL E. HEBERT, OF WEATHERFORD, TEXAS.

INSECT EXTERMINATOR.

Application filed October 14, 1921. Serial No. 507,624.

*To all whom it may concern:*

Be it known that I, PAUL E. HEBERT, a citizen of the United States, residing at Weatherford, in the county of Parker and State of Texas, have invented certain new and useful Improvements in Insect Exterminators, of which the following is a specification.

This invention relates to new and useful improvements in insect exterminators, and particularly to means for destroying boll weevils and other insects that infest cotton crops.

The primary object of the invention is to provide an exterminator of the hydro-carbon burner type that may be readily mounted upon the frame of a cultivator.

Another object is to arrange the burners at the outer ends of the cultivator beams, so as to travel between the rows and destroy the insects and infected bolls in the furrows. This arrangement is of particular advantage in that it permits of the vertical adjustment of the burners by the cultivator handles, whereby said burners may be raised to pass over obstacles and variations in the path.

A particular feature resides in arcuate hoods disposed over the burners, for the purpose of confining the flames within a limited area.

Another feature resides in a simple structure which is inexpensive and embodies a minimum number of parts.

A construction designed to carry out the invention will be hereinafter described together with other features of the invention.

The invention will be more readily understood from a reading of the following specification and by reference to accompanying drawings, in which an example of the invention is shown and wherein:

Fig. 1 is a perspective view of a cultivator, upon which is mounted an exterminator embodying my invention, Fig. 2 is a plan view of the same, Fig. 3 is an enlarged detail of the oil fuel tank, and Fig. 4 is an enlarged detail showing the flexible section in one of the supply pipes.

In the drawings the numeral 10 designates an oil fuel tank mounted upon a cultivator. It is to be understood that the cultivator itself forms no part of the invention, and that any ordinary cultivator may be used for carrying a device embodying the invention.

The said tank is preferably arranged centrally of the frame and secured to the tongue 32 and the arch axle 36 by suitable clamps 11 and 12. A hand pump 13 is provided at one side of said tank and communicates with the latter by means of a pipe 14, whereby the fuel oil in the tank may be put under pressure. A control valve 15 is connected in said pipe and the pressure is registered by a gauge 16 mounted on the tank.

Oil supply pipes 17 and 17' having communication with the inside of the tank 10 extend laterally in opposite directions and are joined to vertical sections 18 and 18', which terminate near the ends of the forward arch 19 on which the beams 20 are pivotally supported.

At the outer or free end of each beam 20 is located an arcuate hood 27, which may be secured to the underside of the beam by any suitable means such as hangers 33 or the like. Hydro-carbon burners 21 are disposed under the hoods and are directed forwardly so as to cast their flames upon the ground, said burners being supported by any suitable means. The forward end 27' of each hood is tapered so as to offer less resistance to obstacles or variations in the path. A plurality of draught holes 29 are provided in the said end to promote combustion. Chains 28 fastened at one end to the beams 20, have their outer ends secured to the forward end of the hoods, thereby providing an additional means of support for the said hoods.

Pipes 22 and 22' extend along the undersides of the beams 20 to the burners 21. Flexible sections 24 and 24' are coiled around the ends of the arch 19 and connected to the section 18 and pipe 22, and section 18' and pipe 22', respectively. It will be seen that continuous conductors are thereby formed from the tank 10 to the burners 21. The end of each pipe opposite the burner may be supported by a flexible element 34 wrapped around said pipe and the beam, if it is desired. The flexible sections 24 and 24' permit of the vertical adjustment of the burners and hoods as a unit by the handles 23, without injury to the fuel conductors. Control valves 26 and 26' connected in the pipes 17 and 17' are for regulating the flow of oil to the burners.

For agitating the plants I suspend a plurality of chains 31 from a bar 30 secured to the underside of the tongue. It will be seen that said chains striking the plants will dislodge insects and infected cotton bolls, which fall into the furrows and are destroyed by the heat and flames from the burners which travel between the rows. The chains provide a very simple and inexpensive agitating device, however, it is to be understood that various other devices may be employed for this purpose.

It is obvious that an exterminator constructed in accordance with the invention embodies a minimum number of parts, and is highly effective for destroying boll weevils and other insects. Such a device may be easily mounted upon a cultivator and conveniently operated from the seat 35 thereof.

What I claim, is:

In the exterminator of the class described, the combination with a cultivator, the frame and pivoted beams thereof, of hoods suspended from the rear ends of said beams and movable therewith, burners mounted in said hoods, a fuel tank mounted on the frame, fuel conductors leading from the tank to the burners in the hoods, and agitators depending from the forward portion of the cultivator frame for dislodging insects and bolls so that the latter fall into the path of the hoods.

In testimony whereof I affix my signature.

PAUL E. HEBERT.